United States Patent [19]

Boyd

[11] Patent Number: 4,798,565
[45] Date of Patent: Jan. 17, 1989

[54] CHAIN WHEEL ASSEMBLY

[76] Inventor: Winnett Boyd, 107 Victoria Place, R.R. No. 1, Bobcaygeon, Ontario, Canada, K0M 1A0

[21] Appl. No.: 72,026
[22] Filed: Jul. 9, 1987
[51] Int. Cl.[4] .............................................. G05G 1/14
[52] U.S. Cl. ..................................... 474/158; 474/160
[58] Field of Search .................. 474/77, 78, 152, 158, 474/160; 74/594.2; 192/5

[56] References Cited

U.S. PATENT DOCUMENTS

| 591,082 | 10/1897 | Moran | 474/158 |
| 659,713 | 10/1900 | Stilmant | 74/594.2 |
| 3,888,334 | 6/1975 | Mack | 188/24 |
| 4,260,044 | 4/1981 | Foster | 192/5 |
| 4,439,172 | 3/1984 | Segawa | 474/160 |
| 4,583,422 | 4/1986 | Boyd | 74/594.2 |

FOREIGN PATENT DOCUMENTS 205840 6/1939 Switzerland .

Primary Examiner—Stephen J. Novosad
Assistant Examiner—Matthew Smith
Attorney, Agent, or Firm—Ridout & Maybee

[57] ABSTRACT

A lost motion chain wheel assembly to prevent brake lock up in a bicycle having a pedal crank shaft operated brake, has a chain wheel center or spider fast to a pedal crank and providing an annular channel receiving the inner periphery of an annular chain wheel rim, the rim and the center being coupled by dogs within the channel forming projections into recesses in the internal periphery of the rim, and connected by a bias spring. The recesses have a greater peripheral extent than the projections so as to provide the desired lost motion, and both recesses and projections are inwardly inclined at their ends to provide abutting surfaces which cushion the impacts occurring at the ends of the relative travel of the parts. The center or spider and the rim may readily be adapted from parts of a conventional double chain wheel.

6 Claims, 4 Drawing Sheets

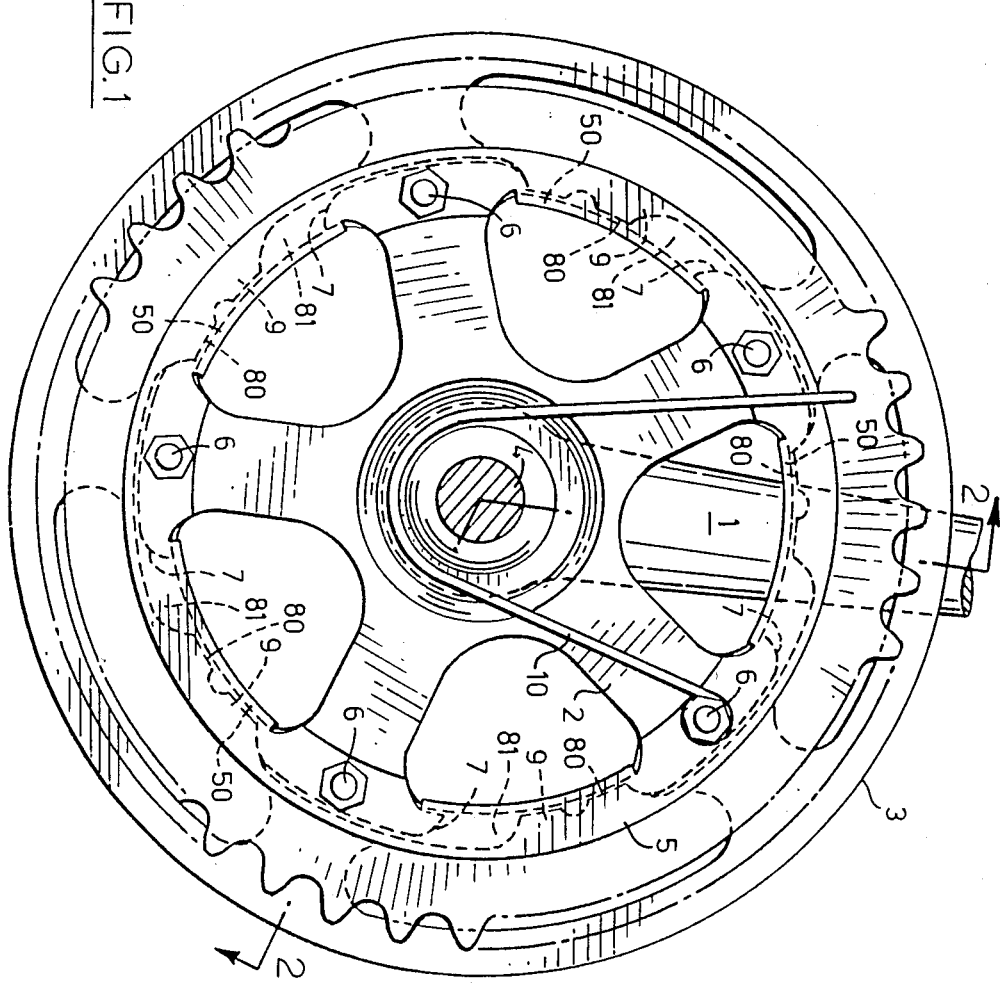
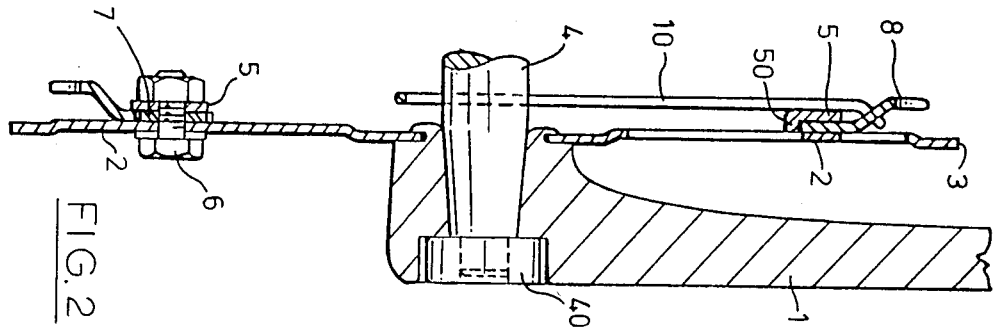

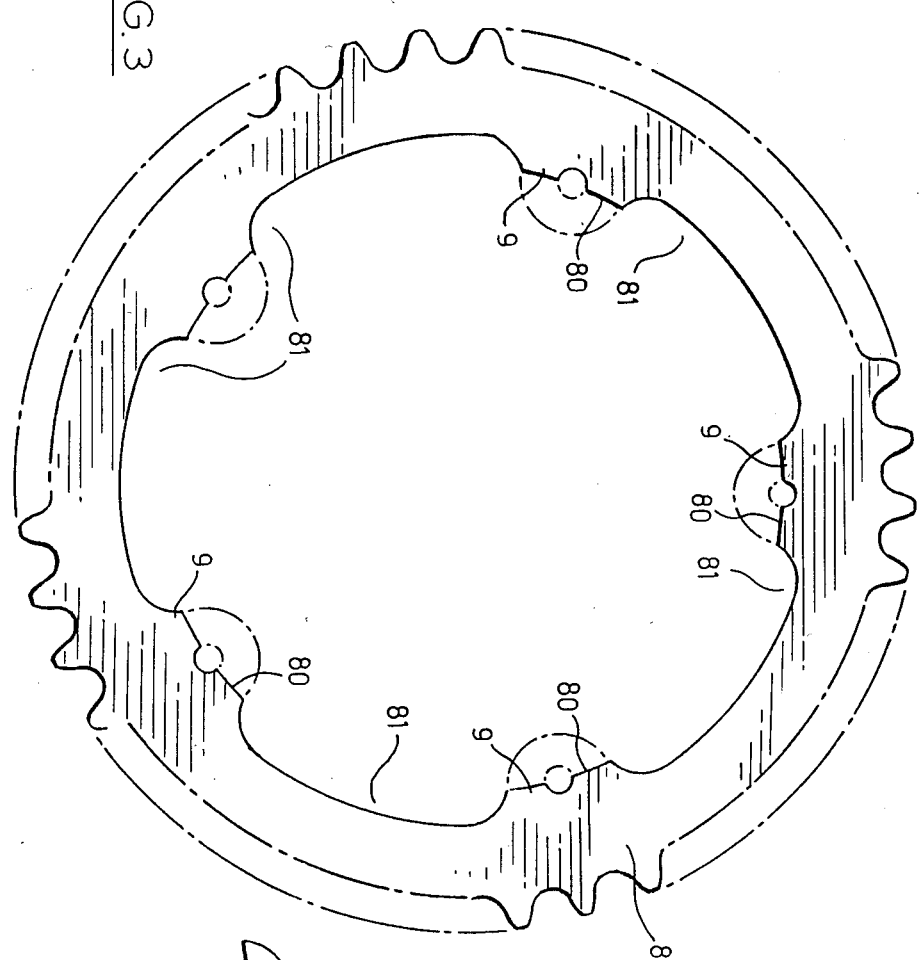
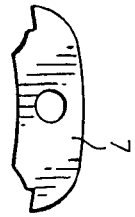

CHAIN WHEEL ASSEMBLY

FIELD OF THE INVENTION

This invention relates to a chain wheel assembly for pedal operated vehicles such as bicycles, more particularly bicycles equipped with a brake activated by a pedal crankshaft operator.

BACKGROUND OF THE INVENTION

A characteristic of bicycles having this type of brake operator for the driven wheel is that an application of the brake sufficient to lock the driven wheel will also lock the chain wheel which is in driving connection with the driven wheel through the chain. It is therefore necessary to make provision for sufficient forward movement of the pedal crankshaft independent of the chain wheel to permit release of the brake. This problem has been recognized in the art, and proposals have been made to permit the necessary lost motion between the chain wheel and the pedal crankshaft. Examples of such arrangements are to be found in U.S. Pat. Nos. 3,888,334 (Mack), 4,134,481 (Calderazzo), 4,260,044 (Foster) (this is only exemplary of several Foster patents showing this feature), Swiss Pat. No. 205,840 (Montanus), and in my own U.S. Pat. No. 4,462,488. A potential problem common to all of these arrangements is that whilst they provide the desired lost motion, the connection between the chain wheel and the pedal crank is such that the lost motion may be accompanied by wobbling or unsteadiness of the chain wheel, particularly as wear takes place. In most cases, the centre of the chain wheel is supported directly on the pedal crank, so that any lateral free play at the point of support will result in a much greater "wobble" of the wheel at its perimeter, or is supported by spaced pin and slot connections to a plate or spider fast to the crankshaft. Whilst the latter arrangement reduces amplification of wobble in the system, it is difficult to provide a pin and slot connection which is free of play in an unwanted direction, and the bearing surfaces available are very restricted. A further problem in many arrangements lies in avoiding jerky operation as the lost motion between the crank and the chain wheel is taken up during normal operation of the bicycle. In my U.S. Pat. No. 4,583,422 I describe an arrangement for mounting a chain wheel on a pedal crank which addresses the "wobble" problem, whilst a solution to the problem of jerky operation is disclosed in my U.S. Pat. No. 4,462,488 already mentioned above, utilizing a suitably calibrated spring to connect the parts.

SUMMARY OF THE INVENTION

I have now developed a further lost motion chain wheel assembly which can not only provide good control of chain wheel wobble, but can be made substantially less jerky in operation even without optimum spring control of the lost motion, as well as being suitable for conventional forms of mounting to the pedal crank and being easily and cheaply manufactured primarily from bicycle components readily available in the market place.

According to the invention, a lost motion chain wheel assembly for a pedal operated vehicle comprises a chain wheel centre for fixed mounting to a pedal crank, an externally toothed annular chain wheel rim retained concentrically on the chain wheel centre for limited rotation relative thereto, and bias spring means acting between the chain wheel centre and the chain wheel rim to bias the rim forwardly relative to the centre in relation to the intended direction of forward rotation of the chain wheel, the chain wheel rim defining on its inner periphery a plurality of peripherally spaced concave recesses, and the chain wheel centre having a journal supporting the inner periphery of the chain wheel rim and a plurality of peripherally spaced convex projections entering the recesses but of lesser peripheral extent than the latter whereby to provide for said limited relative rotation.

The chain wheel centre may be secured to a pedal crank in any conventional manner, and may in fact be formed by modification of a conventional chain wheel as discussed further below. The chain wheel rim may be adequately supported on ample bearing surfaces much nearer the rim than the centre of the chain wheel, thus addressing the wobble and wear problems, and the recesses and projections can be profiled to minimize the jerks occurring as the rim reaches the ends of its travel relative to the chain wheel centre. The chain wheel centre and rim may be readily adapted from chain wheel components already available for use in dual chain wheel assemblies widely used in multiple speed bicycles using derailleur gear shift systems.

Further features of the invention will become apparent from the following description with reference to the accompanying drawings.

SHORT DESCRIPTION OF THE DRAWINGS

In the drawings:

FIG. 1 is a side elevation of a pedal crank and chain wheel assembly incorporating my invention, as seen from the left hand side of a bicycle;

FIG. 2 is a section on the line A—A in FIG. 1;

FIG. 3 is an axial view of the rim of the chain wheel shown in FIG. 1;

FIG. 6 is an axial view of a dog for transmitting forces between the centre and rim of the chain wheel;

DESCRIPTION OF THE PREFERRED EMBODIMENTS

Figure 4:
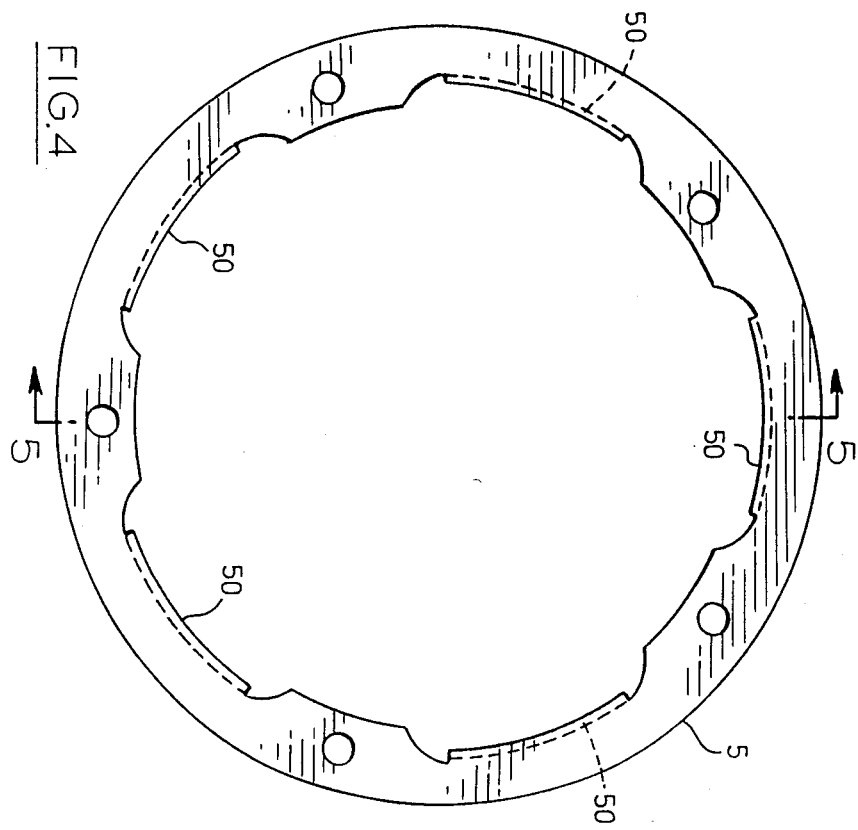
FIG. 4 is a corresponding view of a chain wheel rim retainer.
Figure 5:
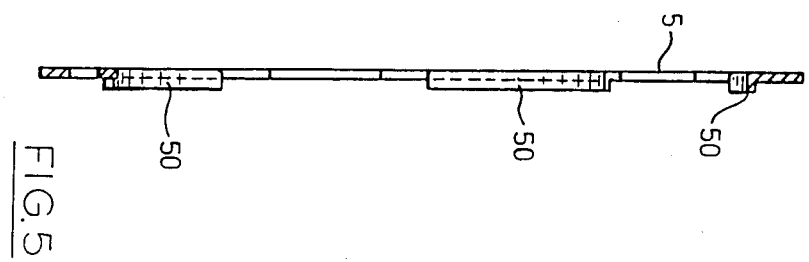
FIG. 5 is a diametric cross section of the retainer on the line B—B in FIG. 4.
Figure 7:
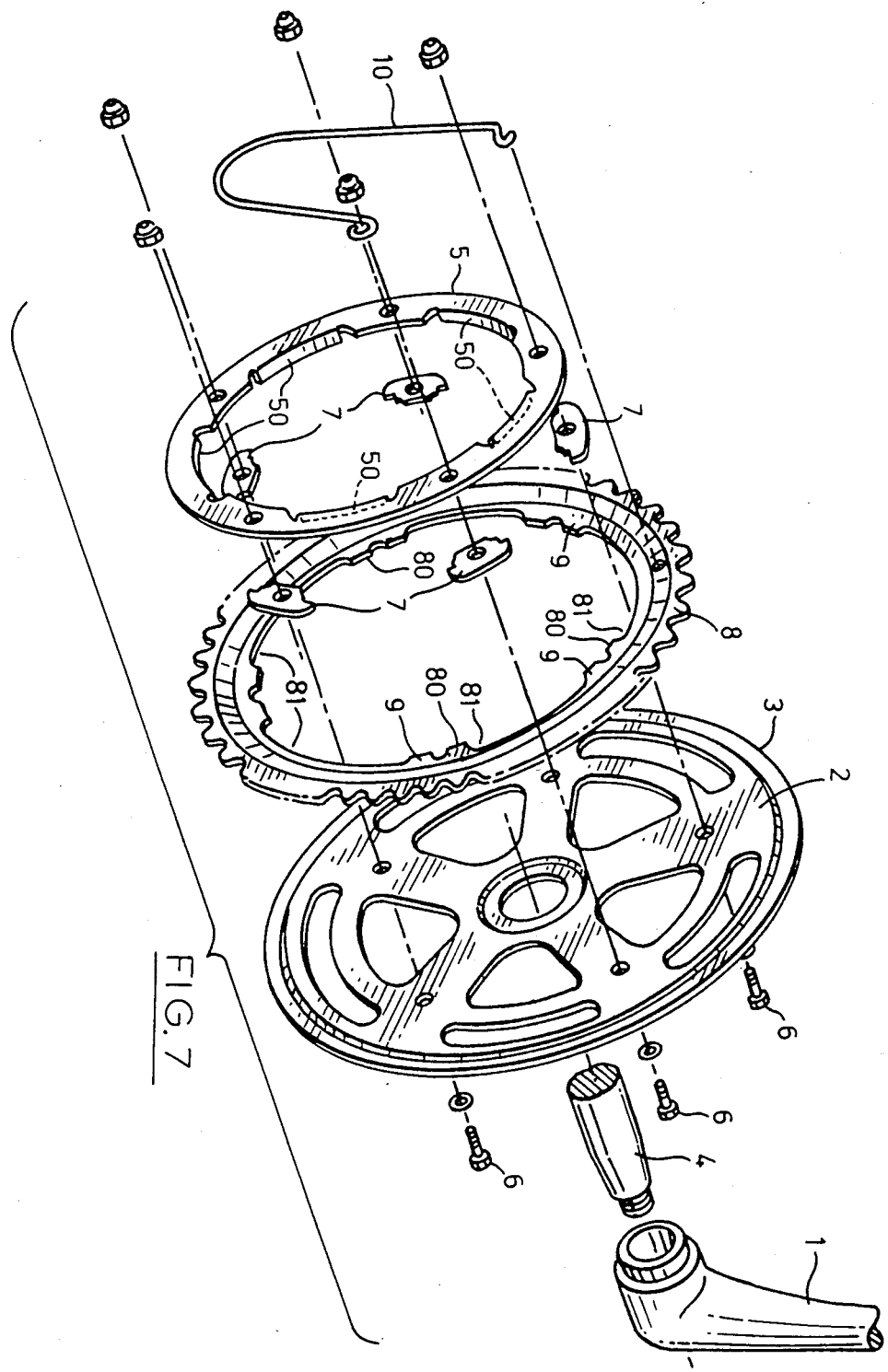
FIG. 7 is an exploded perspective view of the assembly shown in FIG. 1.

Referring to the drawings, a right hand pedal crank or arm 1 is permanently attached to a chain wheel centre or spider 2, the outside diameter 3 of which acts as a chain guard. The spider 2 may be formed from the primary chain wheel of a conventional dual chain wheel assembly by either cutting away its teeth or covering them up with an annular guard of suitable configuration. The assembly so formed is attached to a pedal crankshaft 4 of a bicycle, in this case by a cotterless connection using a securing nut 40. A chain wheel rim 8, formed in this case from the secondary chain wheel of the conventional dual chain wheel assembly, is supported by the spider 2, but is not bolted directly to it as in the conventional arrangement. Instead, the lugs 9 containing the holes for the conventional bolts are ground away (see FIG. 3) so as to provide the rim 8 with an internal periphery 80 engageable by peripherally extending flanges 50 struck out of the plane of the inner periphery on annular chain wheel rim retainer 5, the depth of the flanges 50 being sufficient to form an annular channel accommodating the inner periphery of the rim 8 (see FIG. 2). Located in the retainer 5 between the flanges 50 are driving dogs 7 forming peripheral projections entering recesses 81 in the inner periphery of the chain wheel rim between the lugs 9. The peripheral extent of the projections formed by dogs 7 is less than that of the recesses 81. The parts of the chain wheel assembly are held together by bolts 6 passing through holes formed in the chain wheel centre, the dogs 7 and the retainer 5.

The inner peripheral portions of the chain wheel rim are thus captive in an annular channel formed between the spider 2 and the retainer 5, with the external peripheral surfaces of the flanges 50 forming a journal for relative rotational movement between the chain wheel rim and the spider 2, this journal having a circumference much nearer to the outer periphery of the rim than to the actual centre of rotation of the assembly. Wobbling of the chain wheel rim to any significant extent is prevented by the retainer 5, which also provides ample bearing surfaces for the rim thus reducing the rate at which play may develop due to wear. A hairpin spring 10 is connected at one end to one of the bolts 6 and at the other end is engages the rim 8, the bight of the spring surrounding the crankshaft 4 so as to bias the rim in an anticlockwise (as seen in FIG. 1) direction relative to the spider 2 and force the right hand ends of the dogs 7 against the right hand ends of the recesses in the chain wheel 8. On application of forward pedalling torque to a bicycle incorporating the chain wheel assembly, the dogs move towards the left hand ends of the recesses as they overcome the bias of the spring 10. Since both the recesses in the rim 8 and the projections formed by the dogs 7 have end portions which are inwardly divergent, the cessation of relative movement at either end of the range of movement permitted by the interaction of the recesses and the projections is less abrupt than it would otherwise be, and may be further cushioned by slight-resilient deformation of the rim and/or the retainer responsive to radial components of the reaction forces developed by interaction of the parts. Regardless of the reason, the limiting of relative movement is substantially less harsh than with prior art pin and slot connections, without the necessity for placing cushioning material between the parts. By suitably selecting the relative peripheral dimensions and number of the dogs 7 and the recesses in the chain wheel rim 8, a desired angle of lost motion between the chain wheel rim and centre may be achieved. About 10°–15° of movement is usually sufficient, and is readily achieved with the arrangement described.

The embodiments of the invention in which an exclusive property or privilege is claimed are defined as follows:

1. A lost motion chain wheel assembly for a pedal operated vehicle comprising a chain wheel centre for fixed mounting to a pedal crank, an externally toothed annular chain wheel rim retained concentrically on the chain wheel centre for limited rotation relative thereto, and bias spring means acting between the chain wheel centre and the chain wheel rim to bias the rim forwardly relative to the centre in relation to the intended direction of forward rotation of the chain wheel, the chain wheel rim defining on its inner periphery a plurality of peripherally spaced concave recesses, and the chain wheel centre having a journal supporting the inner periphery of the chain wheel rim on a circumference much nearer to the outer periphery of the rim than to an actual centre of rotation of the assembly, as well as a plurality of peripherally spaced convex projections entering the recesses, the projections being of lesser peripheral extent than the recesses whereby to provide for said limited relative rotation.

2. A chain wheel assembly according to claim 1, wherein the recesses and projections have outer peripheries with a substantially common radius, and diverging inturned end portions of a configuration such that reaction forces developed, when relative rotational movement of the wheel centre and rim bring said portions into contact, have a substantial radial component.

3. A chain wheel assembly according to claim 2, wherein the end portions have a radius much less than said common radius.

4. A chain wheel assembly according to claim 2, wherein the chain wheel centre is of larger radius than the inner radius of the rim, the projections entering the recesses in the rim are separately formed elements, and an annular retaining member is provided having a larger radius than the inner radius of the rim, and the elements forming the projections are captive between the chain wheel centre and the retaining member.

5. A chain wheel assembly according to claim 4, wherein the retaining member has arcuate flanges struck out of its plane and spaced around its inner periphery, the flanges forming the journal for the chain wheel rim and engaging the chain wheel centre so that the retaining member forms with the chain wheel centre an annular channel receiving the inner periphery of the chain wheel rim, the elements forming the projections being secured in the channel between the flanges.

6. A chain wheel assembly according to claim 5, wherein the bias spring means is a hairpin spring having opposite ends attached to the chain wheel centre and rim respectively and a bight portion coaxial with the chain wheel centre.

* * * * *